United States Patent [19]

Gupta et al.

[11] 3,927,280

[45] Dec. 16, 1975

[54] NEGATIVE IMPEDANCE REPEATER

[75] Inventors: Shanti S. Gupta, Naperville; Robert G. Pershing, Glen Ellyn, both of Ill.

[73] Assignee: Wescom, Inc., Downers Grove, Ill.

[22] Filed: May 13, 1974

[21] Appl. No.: 469,643

[52] U.S. Cl. .......................... 179/170 G; 333/80 R

[51] Int. Cl.² ...................... H04B 3/18; H04B 3/36

[58] Field of Search .................... 179/170 G, 170 R; 333/80 R, 80 T

[56] References Cited

UNITED STATES PATENTS

| | | | |
|---|---|---|---|
| 2,792,553 | 5/1957 | Moulon | 179/170 G |
| 3,024,324 | 3/1962 | Dimmer | 179/170 G |
| 3,068,329 | 12/1962 | DeMonte et al. | 179/170 G |
| 3,204,048 | 8/1965 | DeMonte | 333/80 R |
| 3,303,437 | 2/1967 | DeMonte | 179/170 G |
| 3,814,866 | 6/1974 | Japenga | 179/170 G |
| 3,814,867 | 6/1974 | Boucher | 179/170 G |
| 3,828,281 | 8/1974 | Chambers, Jr. | 179/170 G |
| 3,832,654 | 8/1974 | Kiko | 333/80 R |
| 3,860,767 | 1/1975 | Boucher et al. | 179/170 G |

*Primary Examiner*—William C. Cooper
*Assistant Examiner*—Randall P. Myers
*Attorney, Agent, or Firm*—Wolfe, Hubbard, Leydig, Voit & Osann, Ltd.

[57] ABSTRACT

A negative impedance repeater, particularly suited for use with non-loaded metallic transmission facilities, including a bridged-T series-shunt negative impedance gain unit, and an active impedance correcting unit for matching the impedance of the facility to the fixed image impedance of the gain unit. The impedance corrector, which may be modeled as a variable resistor (positive or negative) in series with a variable negative capacitor, is adapted to decrease the impedance of the facility below a predetermined crossover frequency, and increase its impedance above that frequency. The gain unit is arranged to provide a gain vs. frequency characteristic which is sloped to complement the attenuation vs. frequency slope of corrected transmission facilities.

21 Claims, 10 Drawing Figures

NEGATIVE IMPEDANCE REPEATER

This invention relates to negative impedance repeaters, and more particularly to those adapted for use in non-loaded transmission facilities.

Negative impedance repeaters, operating in the audio frequency range, find extensive application in the telephone industry, for example, in increasing the transmission range of subscriber loops or trunks between switching offices. The prior art includes both series and shunt negative impedance elements, as well as combinations thereof. For example, a widely adopted configuration is the series-shunt bridged-T arrangement, adapted to provide overall gain while maintaining a fixed image impedance. For reasons to be described below, however, the utilization of such repeaters has generally been restricted to loaded transmission facilities.

As a general concept, a negative impedance, inserted in series with source and load impedances serves to decrease the impedance of the load presented to the source by increasing the source current thereby providing a gain which is directly proportional to the magnitude of the negative impedance. As a condition of stability, the magnitude of the negative series impedance must always be less than the magnitude of the sum of the load and source impedances. Violation of this condition causes the system to become unstable and to oscillate. By way of contrast, a negative impedance shunt network serves to increase the load voltage and thereby increases the apparent load impedance presented to the source. Accordingly, the gain provided by the shunt network is inversely proportional to the magnitude of the negative impedance. As a condition of stability, the magnitude of the negative shunt impedance must always be greater than the parallel combination of the source and load impedances; violation of such condition causes oscillation or "singing".

With the foregoing in mind, it will be appreciated that the application of negative impedance to transmission lines is extremely dependent upon the predictability of the transmission line characteristics, as those characteristics must satisfy the aforementioned stability criteria. A comparison of the characteristics of loaded and non-loaded cable suggests the difficulty in applying negative impedance to the latter.

As is well known, inductively loaded telephone transmission facilities are implemented by introducing lumped inductance into the transmission line at intervals, to maintain the characteristic line impedance at a nominal 900 ohms in series with 2.15 microfarads. This characteristic impedance is maintained across the audio frequency band, between approximately 300 and 3,000Hz, and is independent of the length or gauge of the cable. By way of contrast, the characteristic impedance of a non-loaded cable is a function of the gauge of the cable as well as of the frequency of the signal applied to the cable.

As a general rule, the attenuation of a cable is dependent upon both the length and gauge of the cable. In the case of loaded cable, however, the attenuation for a given length and gauge remains nearly constant over the voice frequency band. By way of contrast, the attenuation characteristic of non-loaded cable is also frequency dependent, attenuating higher frequencies to a greater extent than lower frequencies.

In applying the foregoing concepts, it will be seen that in the case of a given loaded transmission facility, as the characteristic impedance and attenuation are both known, and are both frequency invariant, a determinable amount of negative impedance may be inserted in the line with a reasonable expectation that the system will remain stable. However, in the case of non-loaded lines, the frequency dependent characteristics introduce appreciable difficulties.

In spite of this, as economic considerations favor the use of non-loaded cable, telephone companies have used such cable where possible, at least for short, non-repeatered facilities. Additionally, attempts have been made to devise repeaters for use in non-loaded facilities to extend the range thereof. For reasons which will become apparent, these prior attempts have not been completely successful.

A common, prior art, negative impedance repeater utilizes a passive impedance matching network to correct the line impedance, operating in conjunction with a bridged-T negative impedance gain unit. The impedance matching network is adapted to attenuate low frequencies by approximately the same amount that high frequencies are attenuated by the cable, thereby providing amplitude equalization. However, the combined attenuation of the line and the impedance matching network is so great, that large portions of the available repeater gain are sacrificed to overcome these losses. In many cases, the effectiveness of the repeater is reduced to a negligible overall gain.

An alternative prior art approach provides a bidirectional bridged-T negative impedance repeater having provisions for matching the image impedance of the repeater to the characteristic impedance of the cable. Initially, it should be noted that such a system is difficult to install and align, as different gain and impedance setting are required for every length and gauge of cable. Additionally, as the image impedance of the repeater is adjusted to match the impedance of the line, maximum power transfer cannot be attained in terminal repeater applications where one port of the repeater is directly coupled to terminal switching equipment having a characteristic impedance of 900 ohms in series with 2.15 microfarads.

Although not employing the concept of negative impedance, conventional hybrid-type repeaters have also been applied to non-loaded cables. Such repeaters utilize hybrid transformers in conjunction with buildout networks to match the impedance of the hybrid to that of the cable. Initially, it is apparent that, utilizing this technique, maximum power transfer is not achieved, as there is a mismatch between the hybrid and the amplifier itself. In addition, the stability of the repeater is limited by the combined gain of both amplifiers and the combined trans-hybrid loss of the hybrids, greatly reducing the amplitude equalization capabilities.

Finally, attempts have been made to utilize active elements in matching the impedance of a non-loaded cable to the characteristic impedance of a standard negative impedance repeater. While this approach overcomes some of the shortcomings of other prior art approaches, it fails to fully appreciate the important interrelationships between the impedance correcting network and the gain unit, and accordingly sacrifices gain and/or stability.

In view of the foregoing, it is a primary aim of the present invention to provide a negative impedance repeater for use with non-loaded cables, having the capability to provide increased gain while maintaining line stability. Thus, it is a general object to increase the utilization of non-loaded transmission lines by enhancing the characteristics and extending the range thereof.

It is a more detailed object to provide a negative impedance repeater having the capability to match the impedance of a non-loaded transmission line to the standard impedance of its gain unit, and having a gain unit characteristic which complements the corrected characteristic of the transmission line. In accomplishing the foregoing, it is a further object to provide a negative impedance repeater having sufficient flexibility for facile adaptation to a wide range of transmission facilities.

It is a further detailed object to provide a negative impedance repeater, having a frequency variable gain that compensates for the increased losses of non-loaded cables at higher frequencies, while maintaining stability by effectively correcting the impedance of the cable to match the image impedance of the gain unit.

Other objects and advantages will become apparent from the following detailed description when taken in conjunction with the drawings in which.

Figure 3:
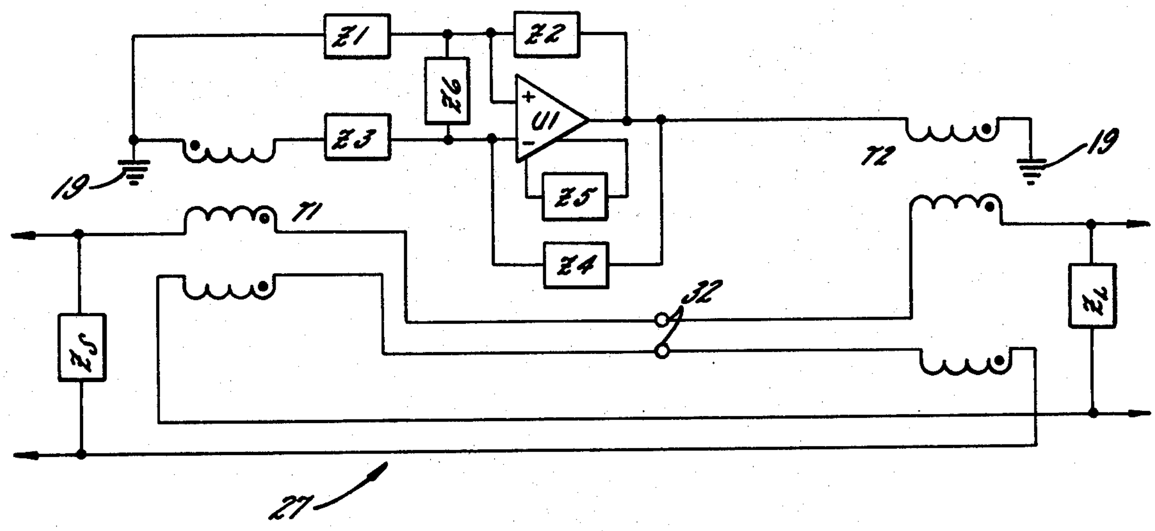
Figure 5:
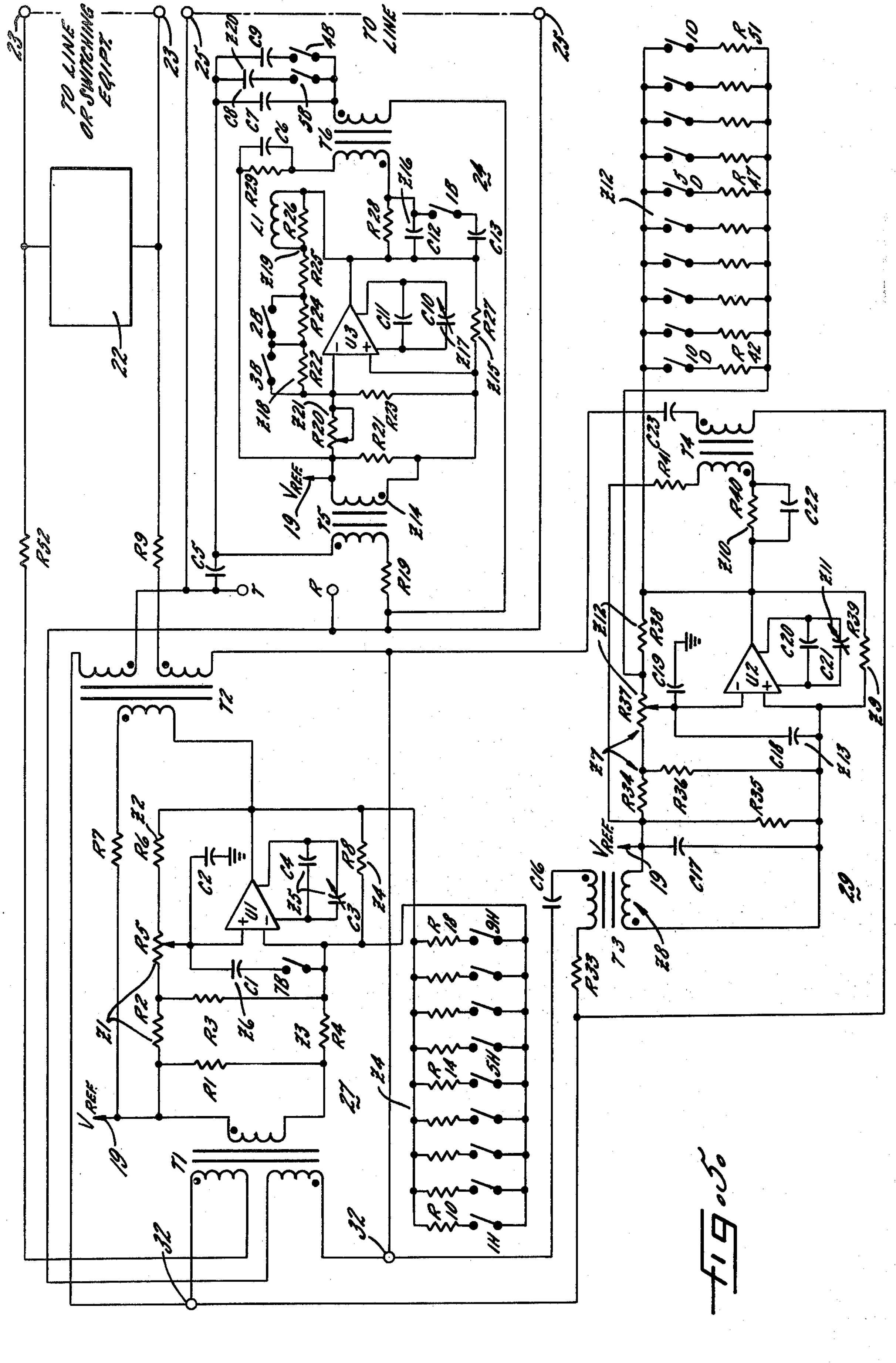
Figure 6A:
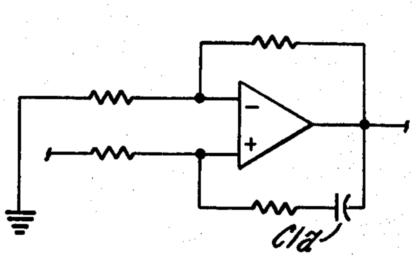
Figure 6B:
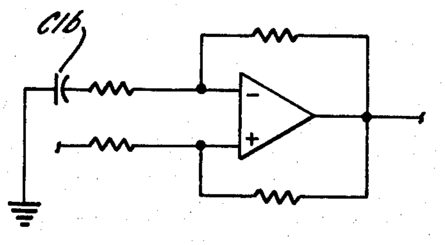
Figure 6C:
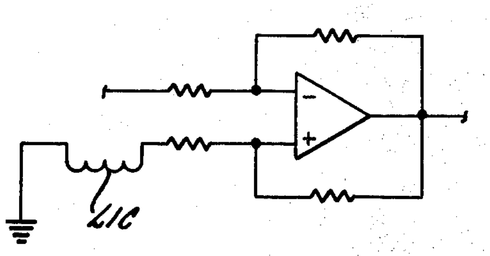
Figure 7B:
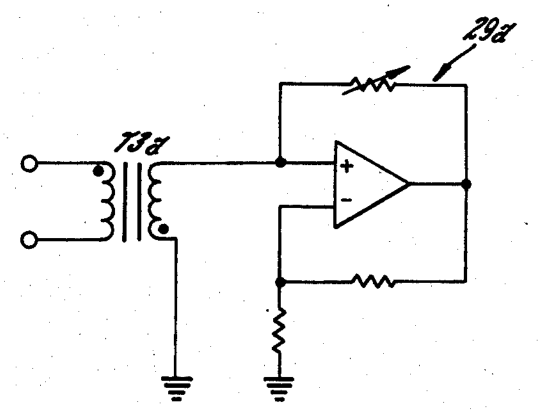
Figure 7A:
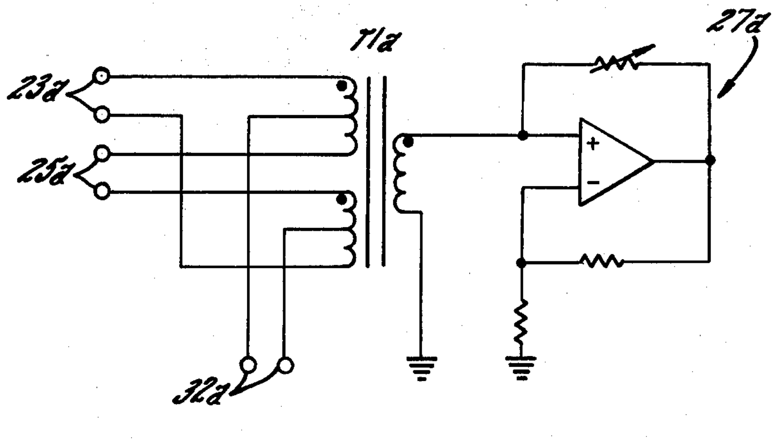

FIGS. 3. and 4 are simplified schematic diagrams of the series and shunt elements of the gain unit of the repeater;

FIG. 5 is a circuit diagram of a preferred embodiment of the negative impedance repeater;

FIGS. 6*a*–6*c* illustrate alternative frequency dependent amplifier configurations for use in the impedance corrector; and FIGS. 7*a* and 7*b* illustrate alternative transformer coupling means for the series and shunt elements respectively.

While the invention will be described in connection with a preferred embodiment, it will be understood that there is no intention to limit it to that embodiment. On the contrary, the intent is to cover all alternatives, modifications and equivalents as may be included within the spirit and scope of the invention, as defined by the appended claims.

Figure 1:
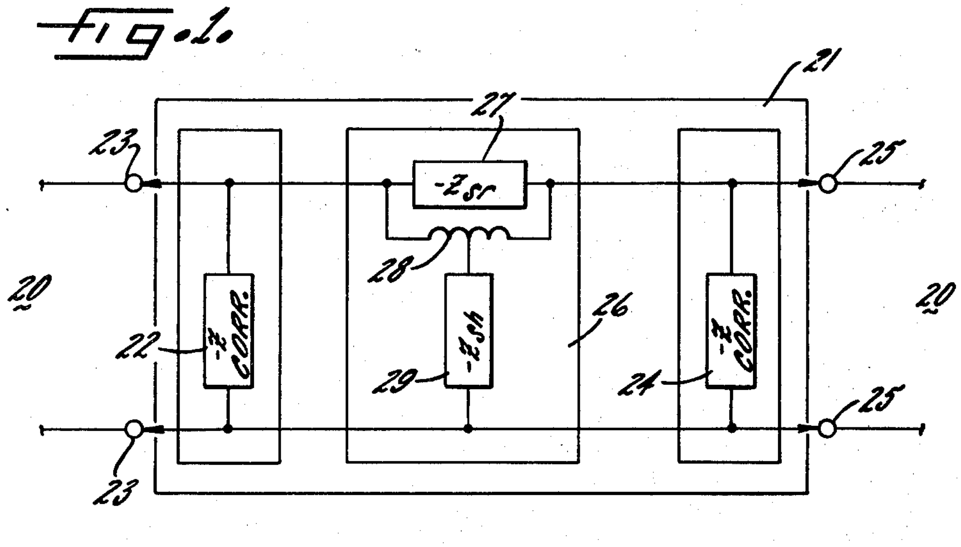
FIG. 1 is a block diagram illustrating a negative impedance repeater constructed in accordance with the invention.

Turning now to the drawings, and particularly to FIG. 1, there is shown a transmission line or facility, generally indicated at 20, incorporating a bidirectional negative impedance repeater 21 constructed in accordance with the invention. Impedance correctors 22 and 24 are bridged across the ports 23 and 25 respectively for correcting the impedances of the respective lines coupled thereto to a nominal 900 ohms in series with 2.15 microfarads. As will become apparent, the impedance correctors 22 and 24 are provided to maintain the corrected impedance at the terminals of the gain unit at a relatively constant magnitude, approximating the image impedance of the gain unit. By way of definition, a device may be considered to have an image impedance when its input and output impedances are equal, the magnitude of the image impedance being equal to the impedance presented by the device. The gain unit itself, generally indicated at 26, is arranged as a bridged-T series-shunt negative impedance network. The series element 27 comprises a negative impedance element connected in series between the source and the load, and having transformer coupling generally indicated at 28 for allowing the passage of DC signals, as well as providing an intermediate bridging connection for the shunt element 29. The characteristics of the series and shunt elements are matched so that the combination produces a fixed two-port image impedance across the audio frequency band, while simultaneously providing a gain vs. frequency characteristic which complements the attenuation characteristic of the corrected cable facility.

In practicing the invention, the impedance of the transmission facility is corrected by reducing the cable impedance below a crossover frequency and increasing the impedance above that frequency. Accordingly, apparent gain is provided at frequencies above the crossover frequency as the corrected facility impedance is increased toward the image impedance of the gain unit, approaching maximum power transfer. In accomplishing the foregoing, the impedance corrector appears as a resistor in series with a negative capacitor shunted across the line impedance. The value of the resistor changes as a function of increasing frequency from a positive to a negative value, passing through zero resistance at a real component transition frequency. The value of the negative capacitor is also frequency dependent, its magnitude decreasing with increasing frequency. It should be noted that the real component transition frequency does not correspond to the gain crossover frequency because of the combined effect of the real and imaginary components of the corrector impedance on the corrected impedance. Generally, the gain crossover frequency is below the real component transition frequency, providing apparent gain over a considerable portion of the audio frequency band. The corrector impedance magnitudes are initially adjusted to track with frequency, the parallel combination of the decreasing line impedance and the corrector impedance resulting in a relatively constant corrected impedance across the audio frequency band.

It should be noted at this point, that the impedance correctors 22 and 24 are required only when the associated cable is of the non-loaded type. In the event the repeater is applied in a terminal location, where the impedance of the equipment coupled to port 23 matches the image impedance of the gain unit, the corrector 22 may be eliminated. Similarly, one of the impedance correctors may be eliminated where the repeater is installed at the juncture of a loaded and a non-loaded cable.

To provide a repeater adaptable to numerous specific transmission facility requirements, means are provided for manually adjusting the impedance characteristics of the corrector unit. For example, the transition frequency at which the real part of the impedance changes from a positive to a negative value may be adjusted, affording the capability to utilize the corrector, without its associated gain unit, to provide a limited amount of gain in medium length transmission facilities by increasing the apparent impedance thereof beyond the nominal value. Additionally, the slope of the negative resistance characteristic at high frequencies may be adjusted, without appreciably affecting the low frequency resistance slope. Accordingly, the amount of high frequency gain provided by the corrector may be adjusted to approximate the attenuation characteristics of the particular transmission facility. The slope of the positive resistance characteristic at lower frequencies may also be adjusted without appreciably affecting the high frequency resistance slope. This provides the capability to decrease the shunting effect of the corrector unit at low frequencies, for example when applying the unit to medium length transmission facilities. Finally, means are provided for adjusting the negative capacitance slope, further increasing the flexibility of the impedance corrector.

The negative impedance repeater will be described both in general terms in connection with FIGS. 2–4, and in more detail in connection with the schematic diagram, FIG. 5. The impedance corrector 24 is bridged across the transmission line generally indicated at 20, the impedances denoted as $Z_S$ and $Z_L$ representing the source and load impedances, respectively. It is apparent that, when the impedance corrector is used with a gain unit, one of such impedances will be the image impedance of the gain unit. The impedance corrector includes an input transformer T5, an output transformer T6, and a differential amplifier U3 with its associated feedback impedances. As is well known, the gain of a differential amplifier is proportional to the difference between positive and negative feedback. It is also known that, in a shunt negative impedance converter, the magnitude of the negative impedance is inversely proportional to the gain of the amplifier, and also that the gain of the converter is inversely proportional to the magnitude of the negative impedance.

In practicing the invention, the amplifier U3 is provided with a plurality of feedback paths, thereby affording the capability to manually adjust the characteristics of the corrector to those of a given line, to automatically vary the characteristics of the corrector with frequency to compensate the line over the necessary frequency band, and to automatically stabilize the corrector under varying line conditions. It is seen that the secondary of the input transformer T5 is coupled between a circuit reference voltage 19 and the non-inverting input of amplifier U3, the impedance Z14 representing the impedance of the transformer T5. The reference voltage 19, when used with dual power supplies having opposite polarities, may be taken as circuit common. Alternatively, if the circuit is constructed utilizing power supplies of a single polarity, the reference voltage 19 may be taken as an intermediate biasing voltage. The impedance Z15, coupled between the amplifier output and its non-inverting input, in conjunction with impedance Z14, forms a first positive feedback path. In a preferred embodiment of the invention, Z15 is a fixed resistor used to establish the basic amount of positive feedback in the unit. Impedances Z18 and Z19 coupled in series between the amplifier output and its inverting input, along with impedance Z21, form a controlled variable negative feedback path. As will become apparent, the impedance Z19 is reactive in nature, causing the negative impedance produced by the unit to be frequency dependent. Additionally, the impedance Z21 is adjustable for allowing the characteristics of the unit to be matched to those of a particular transmission facility.

For maintaining stability at high frequencies, an impedance Z17 is coupled to the compensating terminals of the amplifier U3. Impedance Z17 is capacitive in nature, and is arranged to provide cutoff frequency feedback for decreasing the amplifier gain beyond a preselected cutoff frequency.

The output of amplifier U3 is coupled through impedance Z16 to the primary of output transformer T6. The series combination of the secondary of the transformer T6 and impedance Z20 is coupled across the transmission line 20. Accordingly, the output of the amplifier U3 is both coupled to the transmission line for correcting the impedance thereof, and fed back to the impedance corrector for maintaining stability. In a preferred embodiment, the impedance Z16 is capacitive in nature, and may be adjusted to increase the amount of positive overall feedback at higher frequencies, thus achieving increased gain at higher frequencies. The impedance Z20 is also an element of the overall positive feedback path, and may be adjusted to decrease the positive resistance of the corrector unit at lower frequencies.

Turning more particularly to FIG. 5, there is shown a negative impedance repeater constructed in accordance with the invention, including an impedance correcting unit 24 bridged across port 25. A second, identical impedance corrector, illustrated as block 22, bridged across port 23, may be included in the event the repeater is used at an intermediate position in a non-loaded facility. Alternatively, if the repeater is coupled to equipment having an impedance matching that of the gain unit, the corrector unit 22 may be omitted. The repeater is adapted to be powered by the central office battery and includes an internal regulator (not shown). For example, when used with a 48 volt central office battery, the regulator may provide voltages of −36 and −18 volts referenced to a circuit common. Such voltages are used to supply power to the amplifiers (power connections being omitted for the sake of clarity) and also to provide a biasing supply 19 to the amplifiers ($V_{REF}$), as illustrated.

Figure 2:
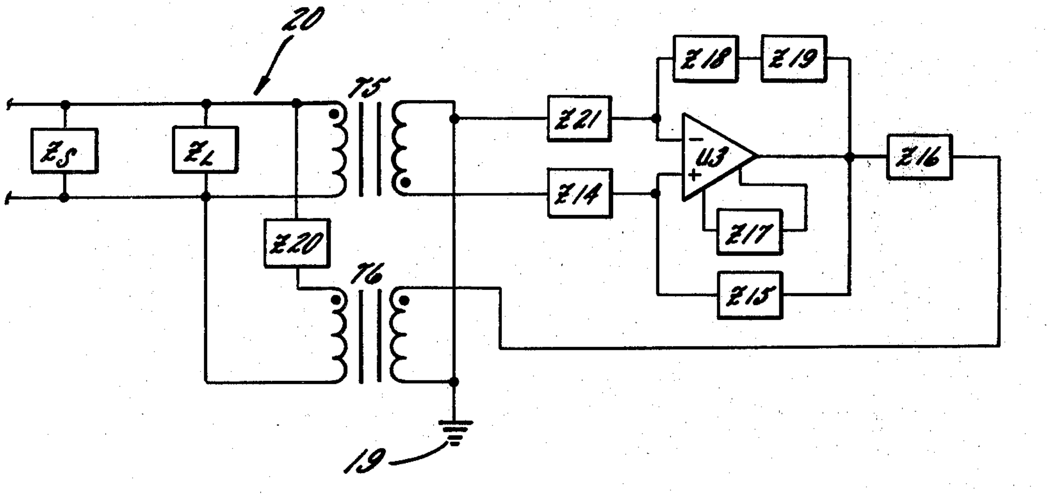
FIG. 2 is a simplified schematic diagram of the impedance corrector element of the negative impedance repeater.

The impedance corrector, described with reference to FIG. 2, is illustrated in greater detail at 24 of FIG. 5. It is seen that the input transformer T5 has its primary coupled to the port 25, and its secondary coupled between the previously mentioned reference supply 19 and the non-inverting input of amplifier U3. The basic positive feedback path for amplifier U3 includes a resistor R27 (Z15), as well as the impedance of the transformer secondary previously denoted as Z14. Accordingly, the basic positive feedback within the corrector unit remains fixed. Amplifier U3 also has a negative feedback path which, as noted above, is both frequency dependent and adjustable. The basic negative feedback path is established with switches 2B and 3B closed, thereby including the parallel combination of inductor L1 and resistor R26 (Z19), in series with resistor R25 and potentiometer R20 (Z21). The voltage dividing action of these components establishes a negative feedback voltage at the inverting terminal of amplifier U3, having a magnitude which, by virtue of the reactance of inductor L1, is dependent upon the frequency of the amplified signal. Resistors R26, R25 and R20 and inductor L1 provide a feedback impedance which determines the magnitude of the frequency dependent negative capacitance. Resistor R20 establishes the basic amount of negative feedback in the unit, thereby establishing the basic gain and terminal impedance of the unit. In practice, potentiometer R20 is adjusted with an input signal varying from 300 Hz to 10 kHz to provide an amount of amplifier gain necessary to correct the impedance of the coupled transmission facility over the frequency range. Switches 2B and 3B are provided to insert resistors R22 and R24 into the feedback path when using the impedance correcting unit independently of its associated gain unit, to provide gain for relatively short transmission facilities. Accordingly, when switches 2B and/or 3B are opened, the amount of negative feedback is decreased, thereby increasing the basic gain of the amplifier U3. As noted above, this results in a decrease in the magnitude of negative impedance provided by the correcting unit raising the corrected impedance beyond the nominal value and thereby providing greater gain to the facility.

To prevent the correcting unit from singing at high frequencies, the cutoff frequency feedback impedance Z17, including capacitors C10 and C11, is coupled to the compensating terminals of the amplifier U3. In practice, a value for C11 is selected, and C10 is adjusted with an input signal of 3 kHz to achieve the required gain at such frequency. The effect of the cutoff frequency feedback is to decrease the high frequency gain of the amplifier, thereby increasing the magnitude of the negative impedance presented by the correcting unit at increasing frequencies, preventing instability beyond the frequency range of the corrector.

Impedance Z16, including the parallel combination of resistor R28 and capacitor C12, is coupled between the output of amplifier U3 and the primary of output transformer T6 for providing a basic amount of overall positive feedback. For increasing the amount of positive feedback at higher frequencies, capacitor C13 may be inserted in parallel with capacitor C12 by closing switch 1B, thereby to adjust the negative resistance slope at high frequencies without appreciably affecting low frequency resistance slope.

Also included in the overall positive feedback path is capacitor C7 coupled between the secondary of transformer T6 and the primary of transformer T5. Capacitors C8 and C9 may be inserted into the positive feedback path in parallel with capacitor C7 by closing switches 5B and 4B, respectively. Capacitors C7, C8 and C9 form the impedance referred to above as Z20, adapted to decrease the positive resistance of the corrector unit at lower frequencies, without appreciably affecting the resistance slope at higher frequencies. This result is accomplished by series resonating one or more of the parallel capacitors with the transformer T6. The insertion of the supplemental capacitor C8 and/or C9 lowers the resonant frequency, thereby providing increased positive feedback at lower frequencies.

It will be appreciated from the foregoing that the impedance correcting unit 24 may be adjusted to correct the impedance of a transmission facility across the audio-frequency band to a nominal 900 ohms in series with 2.15 microfarads. Thus, as the frequency dependence of the facility characteristic impedance is controlled, the gain unit may be adjusted to provide the necessary magnitude of negative impedance consistent with the aforementioned stability criteria. It is further apparent that the manual adjustments described above allow the system to be easily adapted to transmission facilities having widely different characteristics. Additionally, the frequency dependent feedback causes the impedance corrector to be effective over the entire usable frequency band, thereby providing a stable system. Finally, as the impedance of the line is matched to the image impedance of the gain unit, maximum power transfer takes place, further increasing efficiency.

According to a further aspect of the invention, the overall feedback provided within the impedance correcting unit is adapted to enhance system stability by compensating for changes in the characteristics of the transmission facility. More specifically, as both the source and load impedance are elements of the overall positive feedback path, a change in the impedance of the transmission facility will cause the impedance corrector to respond in a direction which will drive the total system toward stability. Such a function is important in normally encountered transmission facilities, in that their impedance is not constant, but varies, for example as a function of weather conditions. In the present impedance corrector, if the transmission facility impedance increases, the overall feedback will cause the negative impedance of the corrector unit to increase correspondingly, thereby maintaining the corrected impedance near the nominal value. Similarly, if the impedance of the transmission facility decreases, the overall feedback causes the magnitude of the negative impedance of the corrector unit to decrease.

In utilizing the impedance corrector with various transmission facilities, it has been discovered that, after the impedances of the various facilities have been corrected, their attenuation slopes are predictable and proportional to length and gauge. In practicing the invention, means are provided for establishing the gain vs. frequency characteristic of the gain unit to complement the known slope of the corrected transmission facility. Accordingly, the gain unit may be constructed to have a fixed gain characteristic which increases gain with frequency. The gain adjustment within the gain unit, which adjusts the unit to a facility of known loss, establishes the overall magnitude of the gain, while maintaining the desired gain vs. frequency slope.

In practicing the invention, the gain unit 26 comprises a bridged-T series-shunt negative impedance combination, having an image impedance which is maintained at 900 ohms in series with 2.15 microfarads, and capable of providing increased gain at higher frequencies, to compensate for the above noted corrected transmission facility characteristic. The series element 27 of the gain unit is illustrated in FIG. 3, including an input transformer T1 having a pair of primary windings coupled to the transmission facility, and output transformer T2 having a pair of secondary windings similarly coupled. It is seen that associated pairs of the windings of transformers T1 and T2 are coupled in series, thereby providing a pair of terminals 32 across which the shunt element may be bridged. The input signal is coupled via the secondary of transformer T1 through impedance Z3 to the inverting input of amplifier U1. Impedance Z2, coupled between the amplifier output and its non-inverting input, in conjunction with impedance Z6 and impedance Z1, forms a basic positive feedback path. Similarly, a basic negative feedback path is formed by impedance Z4, acting in conjunction with impedance Z6 and Z3. As impedance Z6 is reactive in nature, the series element is provided with a gain vs. frequency characteristic having a gain which increases as a function of frequency. Impedance Z5 is coupled to the compensating terminals of amplifier U1 for providing cutoff frequency feedback. Additionally, overall feedback is provided through transformers T1 and T2 acting in conjunction with the source and load impedances.

Figure 4:
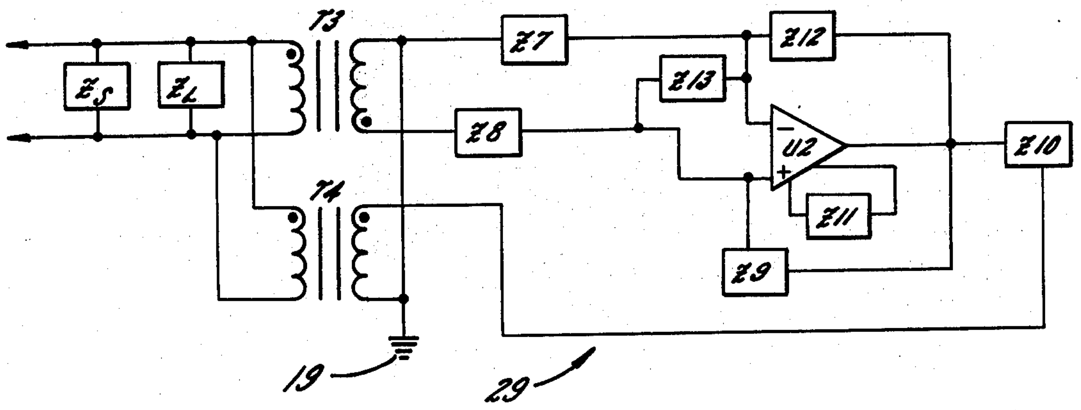

The shunt element 29 of the gain unit is illustrated in FIG. 4, including an input transformer T3, having its primary shunted across the terminals 32 of the series unit. The secondary of transformer T3 is coupled through impedance Z8, representing the impedance of the transformer, to the non-inverting input of differential amplifier U2. An impedance Z9 is coupled between the output of the amplifier and its non-inverting input, forming a basic positive feedback path in conjunction with impedance Z8 and Z13. A basic negative feedback path is provided by impedance Z12 coupled between the amplifier output and the inverting input, in conjunction with impedances Z13 and Z7. In practicing the invention, impedance Z13 is made reactive in nature, thereby providing a gain vs. frequency characteristic having a gain which increases with increasing frequency. It is seen that cutoff frequency feedback Z11 is coupled to the compensating inputs of the amplifier U2 for decreasing the amplifier gain beyond a preselected cutoff frequency. Overall feedback is provided through impedance Z10, transformer T4, transformer T3, the source impedance $Z_S$, and the load impedance $Z_L$.

It should be noted at this point that an important factor in allowing the utilization of a gain unit having the above described frequency compensating gain characteristic, is the compensated line impedance provided by the impedance corrector. More specifically, the effectiveness of the impedance corrector in stabilizing the corrected impedance presented to the gain unit across the audio frequency band, and in increasing the apparent line impedance toward the nominal value at higher frequencies, allows the insertion of additional gain at higher frequencies without violating the aforementioned stability criteria.

Referring to FIG. 5, the detailed schematic representations of the various impedances of the series and shunt elements, set forth with respect to FIGS. 3 and 4, will be apparent, and therefore will not be reiterated in their entirety. It is of note, however, that the shunt element 29 includes a capacitor C18 coupled between the inverting and non-inverting inputs of the amplifier U2, such capacitor forming the impedance Z13, which is an element of both the positive and negative feedback paths. The effect of the capacitor C18 is to decrease the magnitude of the negative impedance of the shunt element as frequency increases, thereby to provide increasing gain with increasing frequency. Recallng that impedance Z12 provides a path for negative feedback, it is seen that a minimum amount of negative feedback is provided by resistor R38, and the amount of negative feedback may be increased utilizing resistors R42–R51 and their corresponding switches 10D–1D respectively. Closure of one or more of such switches decreases the resistance of the negative feedback path, thereby decreasing the gain of amplifier U2, and increasing the magnitude of the negative impedance of the shunt element. Accordingly, resistor R38 sets a minimum value for the magnitude of the negative impedance of the shunt element, which magnitude may be increased by closing one or more of the switches 1D–10D.

The series element 27, illustrated in FIG. 5, includes a capacitor C1 coupled between the inverting and non-inverting inputs of the amplifier U1 for providing an amplifier gain characteristic having increasing gain with increasing frequency. Accordingly, the magnitude of the negative impedance of the series element increases with increasing frequency, complementing the decreasing magnitude of the impedance of the shunt element, thereby maintaining a fixed image-impedance. A switch 7B is provided in series with capacitor C1, for removing the capacitor C1 from the feedback path. Opening of switch 7B removes the high frequency boost, thus providing a flat repeater characteristic, which may be desired, for example, when using the negative impedance repeater with transmission facilities of moderate length, where high frequency attenuation is not severe.

It is seen that the negative feedback network Z4 of the series element 27 is implemented by a fixed resistor R8 coupled in parallel with a plurality of resistors R10–R18, each having associated therewith a selector switch 1H–9H respectively. Accordingly, resistor R8 sets a minimum amount of negative feedback which may be increased by closing one or more of switches 1H–9H. Decreasing the gain in this manner serves to decrease the magnitude of the negative impedance of the series element, for allowing the application of the negative impedance repeater to transmission facilities having widely different attenuation characteristics.

As the shunt element 29 is connected to terminals 32 in bridged-T configuration with the series element 26, and as the negative impedance of the series and shunt elements track each other inversely with frequency, the composite gain unit presents an image impedance which is constant at 900 ohms in series with 2.15 microfarads across the audio frequency band. Additionally, the gain vs. frequency characteristic of each of the series and shunt elements is modified to provide an increasing gain with increasing frequency. More specifically, the magnitude of the negative impedance of the shunt element decreases with increasing frequency, while the magnitude of the negative impedance of the series element increases with frequency. Accordingly, the impedances complement or inversely track each other to provide a constant image impedance, while additionally providing increasing gain with increasing frequency. As noted above, the slope of this gain characteristic complements the slope of the transmission facility characteristic, thereby providing a repeater having greater usable amplification, without increasing the risk of oscillation or singing.

According to another aspect of the invention, to further decrease the possibility of singing, the overall feedback in each of the series and shunt elements (as well as that in the corrector unit described above) is designed to compensate for changes in the system, by driving the system toward stability in reponse to such changes. Of course, such overall compensation is at the expense of amplification, but is still efficiently achievable in the disclosed system. Accordingly, the negative impedance repeater may be installed in a transmission facility, and adjusted for the maximum achievable gain consistent with system stability, without fear that changes in the characteristic of the transmission facility, such as those induced by seasonal changes in temperature, will cause the system to oscillate.

Turning now to FIGS. **6*a*–6*c***, there are shown various alternative amplifier configurations adaptable for use in the impedance corrector, for providing an impedance comprising a frequency dependent reisistor in series with a frequency dependent negative capacitor. FIG. *6a* illustrates an approach wherein the feedback inductor L1 is eliminated from the negative feedback path and replaced by a capacitor C1*a* in the positive feedback path. It is apparent that such an arrangement provides an amplifier having a gain which increases as a function of frequency. The same effect is provided in the FIG. 6*b* arrangement, wherein a capacitor C1*b* is interposed in the negative feedback path to decrease the amount of negative feedback as frequency increases. Finally the inductor L1*c* interposed in the positive feedback path, as illustrated in FIG. 6*c*, is adapted to increase the amount of positive feedback as frequency increases, thereby providing an increasing gain.

For further illustrating the numerous alternative constructions usable in practicing the invention, FIGS. 7*a* and 7*b* show alternative means for coupling the series and shunt elements to the transmission facility using only a single coupling transformer for each element. The amplifier configurations in FIGS. 7*a* and 7*b* are simplified for the sake of clarity. Referring in FIG. 7*a*, it is seen that transformer T1*a* is a component of the series element 27*a*, having ports 23*a* and 25*a* for coupling to the transmission facility, as well as terminals 32*a* across which the shunt element may be bridged. Similarly, the shunt element 29*a* (FIG. 7*b*) includes a single transformer T3*a*. It will be apparent from the foregoing discussion that the series and shunt elements provide feedback currents through their respective transformer secondaries, reflecting a negative impedance to the respective primaries for providing gain to the transmission facility. It is noted, however, that when utilizing the alternate embodiments of FIGS. 7*a* and 7*b*, the overall feedback is sacrificed.

While not intended to limit the scope of the invention in any way, the following list of component values is offered, as teaching the construction of one specific embodiment of the invention:

| | | |
|---|---|---|
| U1-3 | Amplifier | MC 1748G |
| C1 | Capacitor | 0.060 MFD |
| C2 | | 330 PF |
| C3, 10, 21 | | 2.3 - 20 PF |
| C4, 11, 20 | | 10 - 20 PF (Selected) |
| C5, 16 | | 0.55 MFD |
| C6, 17 | | 0.01 MFD |
| C7 | | 0.50 MFD |
| C8 | | 0.22 MFD |
| C9 | | 0.33 MFD |
| C12 | | 1.0 MFD |
| C13 | | 22 MFD |
| C18 | | 0.04 MFD |
| C19 | | 150 PF |
| C22 | | 0.027 MFD |
| C23 | | 0.60 MFD |
| T1, 2 | Transformer | 1-1-1 |
| T3, 5 | | 1-1 |
| T4, 6 | | 1-1 |
| L1 | Inductor | 24.5 mh |
| R1, 25 | Resistor | 150 ohms |
| R2, 6 | | 4.75 K |
| R3, 23, 36 | | 4.7 K |
| R4 | | 1.47 K |
| R5 | Potentiometer | 200 ohms |
| R7 | Resistor | 48.7 ohms |
| R8 | | 1.07 K |
| R9, 52 | | 10 ohms |
| R10 | | 30 K |
| R11 | | 42 K |
| R12 | | 58 K |
| R13 | | 11 K |
| R14 | | 6 K |
| R15 | | 120 K |
| R16 | | 98 K |
| R17 | | 86 K |
| R18 | | 79 K |
| R19, 28, 33, 40 | | 1.0 K |
| R20 | Potentiometer | 5 K |
| R21, 35 | Resistor | 33.2 K |
| R22 | | 100 ohms |
| R24 | | 51.1 ohms |
| R26 | | 1.30 K |
| R27, 39 | | 5.10 K |
| R29, 41 | | 392 ohms |
| R34 | | 15.0 K |
| R37 | Potentiometer | 500 ohms |
| R38 | Resistor | 23.7 K |
| R42 | | 45 K |
| R43 | | 95 K |
| R44 | | 215 K |
| R45 | | 25 K |
| R46 | | 12 K |
| R47 | | 675 K |

-continued

| | |
|---|---|
| R48 | 530 K |
| R49 | 485 K |
| R50 | 440 K |
| R51 | 330 K |

In the foregoing description, it has been set forth that the impedance corrector serves to correct the impedance of the transmission facility to a nominal 900 ohms in series with 2.15 microfarads across the audio frequency band. It will be apparent, however, that utilizing practical components, exact correction is not accomplished. Accordingly, references herein to a corrected nominal impedance are intended to include an impedance generally increased or decreased in a direction toward such nominal impedance.

We claim as our invention:

1. A negative impedance repeater for use with nonloaded transmission facilities comprising in combination, a gain unit having a substantially constant image impedance, impedance corrector means shunted across the transmission facility for correcting the impedance thereof to match the image impedance of the gain unit, said impedance corrector means including amplifier means having feedback paths at least one of which is frequency dependent for establishing a crossover frequency and lowering the apparent impedance of the facility below said crossover frequency and increasing the apparent impedance of the facility above said crossover frequency thereby to yield a corrected impedance having a characteristic attenuation vs. frequency slope, said gain unit including means for providing a gain vs. frequency characteristic which complements the corrected attenuation vs. frequency slope.

2. The negative impedance repeater as set forth in claim 1 wherein the gain unit comprises a series negative impedance element interposed in series with the transmission facility, a shunt negative impedance element arranged in bridged-T configuration with the series element, each of the shunt and series elements including feedback amplifiers for establishing the magnitudes of the negative impedances of said elements to achieve a substantially constant image impedance, the series element feedback paths including means for increasing the magnitude of the negative impedance of the series element with increasing frequency, the shunt element feedback paths including means for decreasing the magnitude of the negative impedance of the shunt element with increasing frequency to complement the increase in magnitude of the series element impedance, whereby the gain unit maintains a substantially constant image impedance while providing a gain which increases as a function of frequency.

3. A negative impedance repeater for use in nonloaded audio frequency transmission facilites comprising in combination, a bridged-T series-shunt gain unit having a substantially constant image impedance across the audio frequency band, active impedance corrector means bridged across the transmission facility for correcting the impedance of the facility to match the image impedance of the gain unit, the impedance corrector means including feedback amplifier means having feedback impedances for causing said active impedance corrector means to shunt the transmission facility with a resistance varying from a positive to a negative value as a function of frequency in series with a frequency dependent negative capacitance thereby to raise the apparent impedance of the facility over a portion of the audio frequency band, said bridged-T sereis-shunt gain unit including gain setting means for establishing the gain of said gain unit, the increased corrected impedance of the facility serving to allow an increased gain for said gain unit while maintaining stable operation within said transmission facility.

4. The negative impedance repeater as set forth in claim 3 wherein the gain unit includes overall feedback means for varying the amount of gain in response to variations in the corrected impedance in a direction oposing oscillation, whereby variations in the characteristic of the transmission facility serve to drive the gain unit in a direction toward stability.

5. The negative impedance repeater as set forth in claim 3 wherein the impedance corrector includes overall feedback means for varying the impedance of the corrector unit in response to changes in impedance in the transmission facility, whereby the corrected impedance of the transmission facility is maintained near the image impedance of the gain unit.

6. An impedance corrector for use in a non-loaded transmission facility comprising in combination, an amplifier arranged to derive an input signal from across the transmission facility, said amplifier having positive and negative feedback paths, at least one of the feedback paths including a frequency dependent impedance, means for coupling the amplifier output signal across the transmission facility to shunt said facility with a frequency dependent impedance comprising a resistance in series with a negative capacitance, means for adjusting at least one of said feedback paths for selecting a gain crossover frequency above which the frequency dependent impedance serves to increase the apparent impedance of the facility, whereby the apparent impedance of the transmission facility is increased to provide apparent gain above said crossover frequency.

7. An impedance corrector for use in a non-loaded transmission facility comprising in combination, an input transformer having a primary shunted across said transmission facility, a differential amplifier having one of its inputs coupled to the secondary of the input transformer, the amplifier output coupled to the primary of an output transformer, the output transformer having a secondary shunted across the transmission facility, the amplifier having a positive feedback path and a negative feedback path, at least one of said feedback paths including a reactance for causing the gain of the amplifier to increase with increasing frequency, at least one of said feedback paths having an adjustable impedance for establishing the basic gain of said amplifier, whereby the shunted impedance corrector appears to the transmission facility as a resistance having a frequency dependent characteristic varying from a positive to a negative value in series with a negative capacitance having a frequency dependent characteristic.

8. The impedance corrector as set forth in claim 7 wherein said impedance corrector is adapted to be used with a gain unit having a substantially constant image impedance, said impedance corrector including means for varying the slope of the frequency dependent resistance and capacitance characteristics, whereby the impedance corrector may be adjusted to correct the impedance of the transmission facility to match the image impedance of the gain unit.

9. The impedance corrector as set forth in claim 7 including means in one of the feedback paths for increasing the amplifier gain above said basic gain to increase the magnitude of the corrected impedance thereby to deliver additional gain to the transmission facility.

10. A two port negative impedance repeater adapted to be interposed in a transmission facility to provide bidirectional gain thereto, the portion of the transmission facility coupled to at least one of said ports having characteristic impedance and attenuation characteristics which are frequency dependent, comprising in combination, a bridged-T series-shunt negative impedance gain unit having a substantially constant image impedance, impedance corrector means coupled in shunting relationship across the gain unit at the port having the frequency dependent transmission facility coupled thereto, the impedance corrector means comprising feedback amplifier means including a feedback reactance for varying the impedance of said corrector over a predetermined frequency range from a first impedance comprising a positive resistor in series with a negative capacitor to a second impedance comprising a negative resistor in series with a negative capacitor, said feedback amplifier further including feedback adjusting means for adjusting the magnitudes of said frequency variable resistor and capacitor over said predetermined frequency range to correct the frequency dependent impedance of the transmission facility to match the image impedance of the gain unit.

11. The negative impedance repeater as set forth in claim 10 wherein one of the ports has an impedance corrector bridged across the transmission facility coupled thereto, the other of said ports adapted to be coupled directly to a transmission facility having a frequency invariant characteristic impedance approximately equal to the image impedance of the gain unit.

12. The negative impedance repeater as set forth in claim 10 wherein the gain unit includes means for increasing the gain thereof as a function of increasing frequency, thereby to compensate the frequency dependent attenuation characteristic of the transmission facility.

13. A negative impedance repeater for use with a non-loaded transmission facility and operable over a predetermined operating frequency range, comprising in combination, a gain unit including a negative impedance series element and a negative impedance shunt element coupled in bridged-T configuration to the transmission facility, impedance corrector means shunted across the transmission facility intermediate the gain unit and the non-loaded transmission facility for providing a correcting impedance shunting the transmission facility, the parallel combination of the correcting impedance and the transmission facility impedance serving to provide a corrected impedance to the gain unit, the impedance corrector means including first amplifier means having positive and negative feedback paths for establishing the gain of the amplifier and thereby the magnitude of the correcting impedance, a reactance interposed in one of said feedback paths for causing the gain of the amplifier to increase with increasing frequency, means interposed in the feedback paths for adjusting the amplifier gain over a predetermined frequency range to produce a correcting impedance having a frequency dependent resistive component which is positive below an intermediate frequency and negative above said intermediate frequency and a frequency dependent negative capacitive component, said adjusting means serving to adjust the magnitude of the resistive and capacitive components to provide a corrected impedance which is substanially constant at a preselected value over said operating frequency range, the series element including second amplifier means having positive and negative feedback paths for establishing the magnitude of the negative impedance thereof, the shunt element including third amplifier means having positive and negative feedback paths for establishing the magnitude of the negative impedance thereof, the feedback paths of the second and third amplifier means arranged to cause the magnitudes of the negative impedances of the series and shunt elements to provide an image impedance which is fixed at the preselected corrected value, each of the impedance corrector means, the series element and the shunt element including overall feedback means for adjusting the gains of the associated amplifiers in a direction to maintain stability in the transmission facility, whereby the negative impedance repeater may be adjusted to provide gain to the transmissiion facility while maintaining stable operation of said facility.

14. The negative impedance repeater as set forth in claim 13 wherein the impedance corrector means serves to modify the characteristic of the transmission facility to provide a characteristic attenuation vs. frequency slope, a second reactance in at least one of the feedback paths of the second amplifier for causing the magnitude of the negative impedance of the series element to increase with increasing frequency, a third reactance in at least one of the feedback paths of the third amplifier for causing the magnitude of the negative impedance of the shunt element to decrease with frequency, the values of the second and third reactances selected to cause the magnitude of the negative impedance of the series element to inversely track the magnitude of the negative impedance of the shunt element with frequency, thereby to provide a gain which increases as a function of frequency while maintaining said fixed image impedance.

15. The negative impedance repeater as set forth in claim 14 further including high frequency cut off feedback means associated with each of the first, second and third amplifier means for reducing the gains of said amplifiers at frequencies higher than the operating frequency range, thereby to enhance the stability of the repeater.

16. A two port negative impedance repeater operable within a predetermined frequency band and adapted to be interposed in a transmission facility for providing bidirectional gain thereto, the segment of the transmission facility coupled to at least one of the ports having an impedance which is frequency dependent, comprising in combination, impedance corrector means bridged across the port to which the frequency dependent transmission facility is coupled, the impedance corrector means including a first input transformer having a primary bridged across the last mentioned port and a first output transformer having a secondary also bridged across said port, a first amplifier having an input coupled to the secondary of the first input transformer and an output coupled to the primary of the first output transformer, the first amplifier having positive and negative feedback paths, a reactance in one of the feedback paths for providing an amplifier gain dependent upon frequency, means in one of said feedback paths for establishing a basic amplifier gain, a gain unit comprising a negative impedance series element and a negative impedance shunt element, the negative impedance series element including second input transformer means for coupling the series element in series with the transmission facility and providing internal terminals for bridging of the shunt element, the series element including a second amplifier coupled to the second transformer means, said second amplifier including positive and negative feedback paths, at least one of said second amplifier feedback paths being adjustable for establishing the gain of the series element, the series element further including a reactance common to the positive and negative feedback paths for providing a gain which increases as a function of frequency, the shunt element including third transformer means having a primary bridged across said terminals for coupling the shunt element to the transmission facility, the shunt element also including a third amplifier coupled to the secondary of the third transformer means, the third amplifier including positive and negative feedback paths, at least one of said third amplifier feedback paths including a variable impedance for adjusting the basic gain of the shunt element, the shunt element further including a reactance common to the positive and negative feedback paths for providing a gain which increases as a function of frequency, whereby enhanced gain is provided to the transmission facility while maintaining stable operation.

17. A two port negative impedance repeater operable within a predetermined frequency band and adapted to be interposed in a transmission facility for providing bidirectional gain thereto, the segment of the transmission facility coupled to at least one of the ports having an impedance which is frequency dependent, comprising in combination, impedance corrector means bridged across the port to which the frequency dependent transmission facility is coupled, the impedance corrector including a first input transformer having a primary bridged across the last mentioned port and a first output transformer having a secondary also bridged across said port, a first amplifier having an input coupled to the secondary of the first input transformer and an output coupled to the primary of the first output transformer, the first amplifier having a positive feedback path and a negative feedback path, an inductor in the negative feedback path for providing an amplifier gain dependent upon frequency, means in one of said feedback paths for establishing a basic amplifier gain, a gain unit comprising a negative impedance series element and a negative impedance shunt element, the negative impedance series element including a second input transformer and a second output transformer having windings coupled in series with the transmission facility and providing internal terminals for bridging of the shunt element, the series element including a second amplifier having an input coupled to the secondary of the second input transformer, said second amplifier including a positive feedback path and a negative feedback path, at least one of said feedback paths being adjustable for establishing the gain of the series element, the series element further including a capacitor common to the positive and negative feedback paths for providing a gain which increases as a function of frequency, the shunt element including a third input transformer having a primary bridged across said terminals and a third output transformer having a secondary bridged across said terminals, the shunt element also including a third amplifier having an input coupled to the secondary of the third input transformer and an output coupled to the primary of the third output transformer, the third amplifier including a positive feedback path and a negative feedback path, at least one of said feedback paths including a variable impedance for adjusting the basic gain of the shunt element, the shunt element further including a capacitor common to the positive and negative feedback paths for providing a gain which increases as a function of frequency, whereby enhanced gain is provided to the transmission facility while maintaining stable operation.

18. The negative impedance repeater as set forth in claim 17 wherein the impedance corrector means includes an overall feedback path including the impedance of the transmission facility, further including a capacitor selectively interposable into said overall feedback path for providing additional gain to the first amplifier at the higher frequencies in the predetermined frequency band.

19. The negative impedance repeater as set forth in claim 18 wherein the impedance corrector means further includes means interposed in the overall feedback path for increasing the gain of the first amplifier at the lower frequencies in the predetermined frequency band.

20. The negative impedance repeater as set forth in claim 17 wherein each of the first, second and third amplifiers includes high frequency cutoff feedback means for reducing the gain of the associated amplifiers at frequencies higher than the predetermined frequency band thereby to increase stability.

21. The negative impedance repeater as set forth in claim 20 wherein each of the series and shunt elements include associated overall feedback paths, said feedback paths adapted to adjust the gains of the associated amplifiers to move the operating point of the repeater toward increased stability in response to variations in the characteristics of the transmission facility.

* * * * *